Sept. 13, 1966     F. McCULLAH     3,272,471
QUICK COUPLING VALVE
Filed April 14, 1964
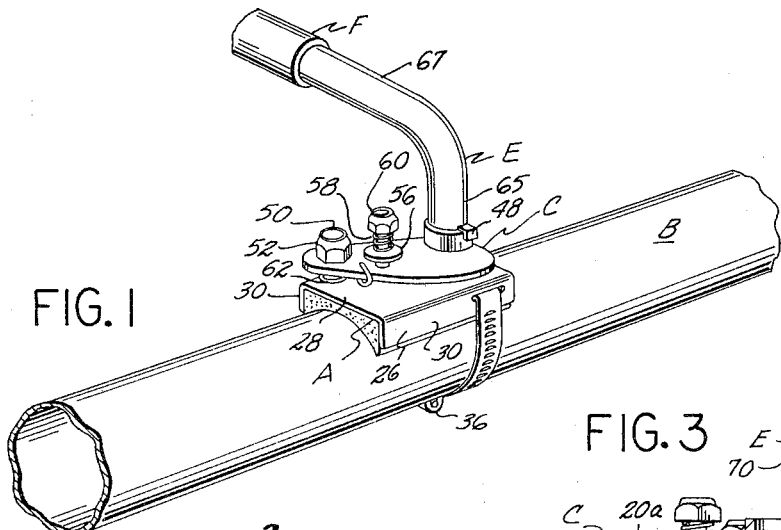
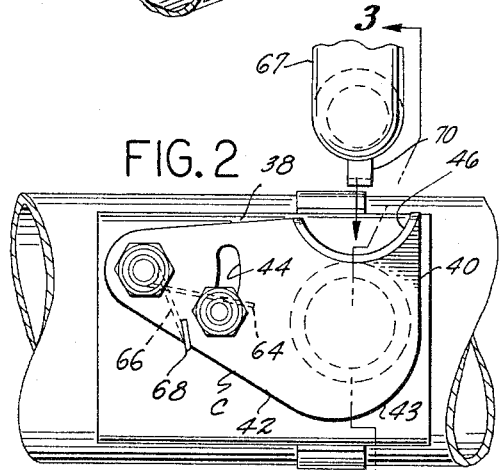
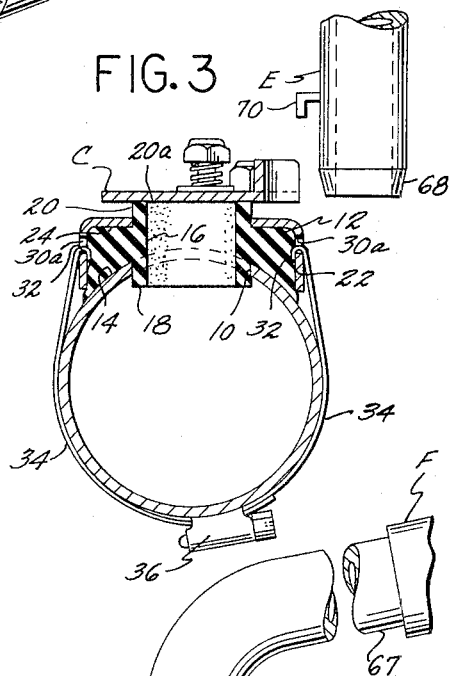
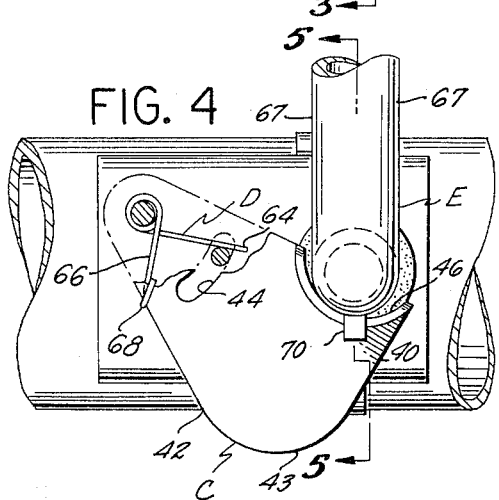
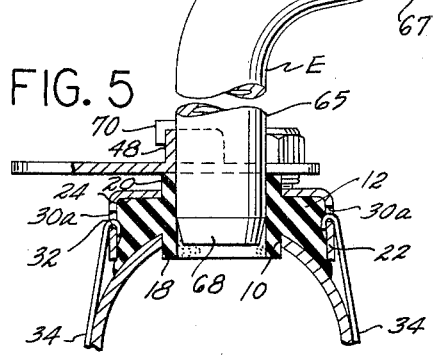
INVENTOR.
FLOYD McCULLAH
BY
William C. Babcock
ATTORNEY

United States Patent Office 3,272,471
Patented Sept. 13, 1966

3,272,471
QUICK COUPLING VALVE
Floyd McCullah, 9111 Holder Road, Cypress, Calif.
Filed Apr. 14, 1964, Ser. No. 359,574
9 Claims. (Cl. 251—146)

The present invention relates generally to the field of quick coupling valves, and more particularly to a valve for use in dairy milk collecting systems.

A major object of the present invention is to provide a quick coupling valve of relatively simple structure that can be either removably or permanently mounted on a tubular header in a dairy to effect communication between the interior of the header and a hose leading from a milking machine.

Another object of the invention is to furnish a valve that automatically seals and prevents communication between the interior of the header and the ambient atmosphere when a nozzle mounted on an end of a hose leading from a milking machine is removed from an engaging position with the valve.

Still another object of the invention is to supply a valve that may be readily cleansed, requires a minimum of maintenance attention, and is free of crevasses or areas difficult of access wherein bacteria may breed.

These and other objects and advantages of the invention will become apparent from the following description of a preferred form thereof, and from the accompanying drawing illustrating the same, in which:

FIGURE 1 is a rear perspective view of the valve of the present invention in engagement with a nozzle connected to a hose leading to a milking machine, with the valve being mounted on a tubular header;

FIGURE 2 is a top plan view of the valve shown in FIGURE 1, but in a closed position;

FIGURE 3 is a transverse cross-sectional view of the valve, together with the tubular member on which it is mounted, and a fragmentary side elevational view of the lower portion of the nozzle, taken on the line 3—3 of FIGURE 2;

FIGURE 4 is a top plan view of the valve in the open position and in engagement with a nozzle connected to a hose leading to a milking machine; and FIGURE 5 is a combined vertical, cross-sectional and elevational view of the valve and nozzle, taken on the line 5—5 of FIGURE 4.

With continued reference to the drawing for the general arrangement of the invention, it will be seen that a valve A is monuted on the upper portion of a tubular header B and in communication with the interior thereof. The valve A includes a horizontal, pivotally supported plate C, best seen in FIGURES 2 and 4, that is at all times urged by spring means D to remain in a first position where communication between the ambient atmosphere and the interior of header B is obstructed.

Plate C is capable of being pivotally moved to a second position, as shown in FIGURES 4 and 5, wherein an L-shaped tubular nozzle E attached to a flexible hose F can be removably inserted within the confines of the valve A to be in communication with the interior of header B. When the plate C is pivoted from the first position (FIGURE 2) to a second position (FIGURE 4), the lower end portion of the nozzle E can be removably inserted in the valve A.

Normally, a vacuum is maintained in header B, whereby when the valve A is in the position shown in FIGURES 1 and 4 and the nozzle E is connected thereto, milk will flow from the hose F connected to a milking machine (not shown) to the interior of the header B. A number of longitudinally spaced openings 10 are formed in the upper portion of header B, but only one of these openings is shown in the drawing, as illustrated in FIGURE 3.

Each of the openings 10 is adapted to have one of the valves A mounted in a communicating position thereon, and each valve so located on the header B is capable of receiving milk from a milking machine (not shown) from one of the nozzles E.

Valve A includes a body 12, best seen in FIGURES 3 and 5, that is formed from a resilient material such as rubber, a polymerized resin, or like material, which is inert relative to milk. The valve body 12 has a lower concave face 14 that curves transversely to engage the convex upper surface of the header B adjacent one of the openings 10 therein. A bore 16 extends downwardly through body 12 to communicate with a downwardly extending boss 18 and an upwardly extending boss 20. The boss 18, as may best be seen in FIGURE 3, extends downwardly through the opening 10 into the confines of the header B. Straight, parallel side walls 22 are provided on valve body 12, as well as a flat upper surface 24 that is in a direction normal relative to the side walls.

The valve A includes a rigid member 26 of inverted channel-shaped cross section defined by a flat web 28 and two legs 30 which extend downwardly from the longitudinal sides thereof, as illustrated in FIGURE 1. The rigid member 26 extends across the top of the valve body 12 and downwardly over the longitudinal sides thereof, as shown in FIGURES 1, 3 and 5. Slots 30a are formed in legs 30, which slots are engaged by hooks 32 formed on the upper ends of two resilient bands 34 of the type used in a hose clamp. The two bands 34 are adapted to be tightened around the header B by a conventional screw-operated hose clamp mechanism 36, as best seen in FIGURE 3.

The plate C (FIGURES 2 and 4) is generally triangular, and defined by three edges 38, 40 and 42. Edges 40 and 42 merge into a curved edge 43. The left-hand edge portion of plate C, as illustrated in FIGURES 2 and 3, has an arcuate slot 44 formed therein, the purpose of which will later be explained. As also seen in FIGURES 2 and 4, the plate C has a curved recess 46 formed therein from which a curved guide wall 48 extends upwardly. A first screw 50 projects upwardly from the rigid member 26 through an opening (not shown) in the plate C to pivotally support the same. The screw 50 also serves to support the spring means D, as best shown in FIGURES 2 4.

The upper end of the screw 50 is threadedly engaged by a nut 52. A second screw 54 also extends up from the rigid member 28, as may best be seen in FIGURE 1, to pass through the slot 44. A washer 56 is mounted on the second screw 54 above plate C, and a helical spring 58 encircles the screw above washer 56. A nut 60 engages the upper portion of the second screw 54, which nut is threaded to the screw sufficiently to place the helical spring 58 under compression. The compressed helical spring 58 serves to maintain the plate C in sealing cotact with the flat upper edge surface 20a of boss 20, both when the plate C is in the first position shown in FIGURE 2, as well as in the second position shown in FIGURE 4.

The second screw 54 and slots 44 cooperatively limit the pivotal movement of the plate C from a first position (FIGURE 2) where it seals access to the bore 16 in the valve body 12, as well as into the second position (FIGURE 4) where the nozzle E can be inserted into the confines of the bore 16 to communicate with the interior of the header B. The spring means D is formed from a bent resilient wire having a coiled portion 62 that extends around the first screw 50. The coiled portion 62 has a leg 64 which extends therefrom and abuts against the second screw 54, as well as a second leg 66 that extends outwardly from the coiled portion to develop into a hook 68 that engages a portion of the plate C adjacent the edge 42 thereof. Due to the resiliency of the wire defining the spring means D, it at all times tends to pivot the place C to the first position shown in FIGURE 2, wherein the plate obstructs access into the bore 16 of the valve body 12.

The nozzle E, as can best be seen in FIGURE 1, is L-shaped, having first and second legs 65 and 67. The second leg 67 is frictionally gripped in one end of the flexible hose F. The first leg 65 (FIGURE 3) is formed with a taper 68 on the free end thereof, to facilitate the insertion thereof into the bore 16 when plate C is moved to the second position shown in FIGURE 4. The first leg 65 preferably has a hook 70 extending outwardly therefrom, which hook engages the upper portion of the guide wall 48 when the valve plate C is moved to the second position shown in FIGURE 4, whereby the first leg 65 is then partially moved downwardly into the confines of the bore 16. The engagement of the hook 70 serves to prevent inadvertent displacement of the nozzle E from the valve A, as well as limiting the extent to which the leg 65 can be inserted into the confines of the valve A.

The use and operation of the invention are relatively simple. After the openings 10 have been formed in the header B, the valves A are mounted on the header in positions to permit the lower bosses 18 to extend through the openings 10, with the valves being removably held in position on the header by the bands 34, and the clamp mechanisms 36. Positioning of the valves A on the header B is preferably such that the plate C pivots away from the user to permit him to contact the curved guide wall 48 by the lower end portion of the nozzle E, to move the valve plate C from the first position shown in FIGURE 2 to the second position shown in FIGURE 4. When the valve plate C has been so moved to the second position, a downward force is exerted on the nozzle to position the nozzle as shown in FIGURE 5 where the hook 70 is in engagement with the guide wall 48. The nozzle E is then in communication with the interior of header B, and due to the vacuum maintained in the header, milk will tend to flow through the hose F, nozzle E, and into the header to flow to a desired location in the dairy and thereafter be processed and bottled or otherwise used.

When the nozzle E is manually removed from the valve A, the spring means D, as previously mentioned, automatically moves the valve plate C from the second position (FIGURE 2) to the position (FIGURE 1) where communication between the ambient atmosphere and the interior of the header B is obstructed, due to the valve plate C being in sealing contact with the upper edge surface 20a of the upper boss 20 as shown in FIGURE 3. Inasmuch as the valve A is to be used in a dairy, the nozzle E, valve plate C, and other metallic components of the assembly will preferably be formed of stainless steel, due to the resistance thereof to corrosion. Loosening of the bands 34 by manipulating the mechanism 36, permits easy removal of valve A from its normal position on the header B for cleansing and inspection purposes.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A quick coupling valve for use in effecting fluid communication between a hose and a tubular header in the upper portion of which header an opening is formed, including:
 (a) a resilient valve body that rests on the upper surface of said header, said body having a bore extending downwardly therethrough, with said bore being in axial alignment with said opening in said header;
 (b) a rigid member that at least partially covers the upper surface of said valve body;
 (c) first means for holding said valve body on said header, with said bore and opening being in said axial alignment;
 (d) a valve plate;
 (e) second means for so pivotally supporting said plate from said rigid member that said plate can be moved to a first position where said plate cooperates with said body to seal the upper end of said bore, and to a second position where the upper end of said bore is unobstructed;
 (f) spring means that at all times tend to maintain said plate in said first position; and
 (g) a tubular nozzle on one end of said hose that is insertable in said bore when said plate is in said second position, which nozzle is of such external diameter as to be snugly and sealingly gripped by said body when disposed in said bore.

2. A valve as defined in claim 1 which further includes:
 (a) a first boss that extends downwardly from said body through said opening in said header; and
 (b) a second boss that extends upwardly from said body, with said first and second bosses being in communication with said bore, which second boss has a flat upper edge surface that is sealingly contacted by said plate when said plate is in said first position.

3. A valve as defined in claim 2 wherein said rigid member is of inverted channel-shaped cross section and overlies said valve body, and said first means comprises a band that transversely encircles said header, with the ends of said band being affixed to said rigid member.

4. A valve as defined in claim 2 wherein said second means includes:
 (a) a first screw that extends upwardly through an opening in said rigid member and an opening in said plate; and
 (b) a first nut that engages the upper end of said first screw to maintain said plate in a pivotal position on said first screw.

5. A valve as defined in claim 4 which further includes:
 (a) a second screw that extends upwardly through an opening in said rigid member and through a transverse arcuate slot in said plate;
 (b) a nut affixed to the upper end of said second screw;
 (c) a compressed helical spring disposed between said nut and plate that holds said plate in sealing contact with said upper edge surface of said second boss when said plate is in said first position, and said arcuate slot of such length that said plate cannot be pivoted beyond said first and second positions.

6. A valve as defined in claim 5 wherein said spring means comprises a resilient wire formed to define a coiled portion that encircles said first screw, which coiled portion has first and second legs projecting therefrom, with said first leg contacting said second screw and second leg engaging a fixed portion of said plate.

7. A valve as defined in claim 2 wherein said plate further includes a curved guide wall that extends upwardly from a recess formed in said plate, with said wall serving to assist in aligning said nozzle with said second boss prior to said nozzle being inserted in said bore.

8. A valve as defined in claim 7 which further includes means for preventing the inadvertent separation of said nozzle from said body.

9. A valve as defined in claim 8 wherein said means for preventing said inadvertent separation is a hook that projects outwardly from said nozzle and slidably engages said guide wall.

References Cited by the Examiner
UNITED STATES PATENTS

| | | | |
|---|---|---|---|
| 2,582,109 | 1/1952 | De Fee | 220—35 |
| 2,630,131 | 3/1953 | Snyder | 251—149.2 |
| 2,949,276 | 8/1960 | Merritt | 251—146 |
| 3,011,755 | 12/1961 | Babson | 251—146 |

M. CARY NELSON, *Primary Examiner.*

W. CLINE, *Examiner.*